United States Patent [19]

Councilman

[11] Patent Number: 4,796,828
[45] Date of Patent: Jan. 10, 1989

[54] CARTRIDGE REAR MOUNTED DRAG ASSEMBLY AND METHOD

[75] Inventor: Richard R. Councilman, Collinsville, Okla.

[73] Assignee: Zebco Corporation, Tulsa, Okla.

[21] Appl. No.: 9,648

[22] Filed: Jan. 28, 1987

Related U.S. Application Data

[63] Continuation of Ser. No. 794,965, Nov. 5, 1985, abandoned, which is a continuation of Ser. No. 670,657, Nov. 9, 1984, abandoned, which is a continuation of Ser. No. 470,604, Feb. 28, 1983, abandoned, which is a continuation-in-part of Ser. No. 406,539, Aug. 9, 1982, Pat. No. 4,488,689.

[51] Int. Cl.⁴ ............................................. A01K 89/00
[52] U.S. Cl. ............................. 242/84.5 A; 242/84.2 R
[58] Field of Search ................. 242/84.2 R, 81.21 R, 242/84.5 A, 84.51 A, 84.5 P; 188/71.5, 73.31, 73.32, 73.33, 73.34

[56] References Cited

U.S. PATENT DOCUMENTS

| | | | |
|---|---|---|---|
| 1,427,025 | 8/1922 | Schlafly . | |
| 2,288,849 | 7/1942 | Schwitzer | 464/46 |
| 2,334,244 | 11/1943 | Burdick | 242/84.5 R |
| 2,646,939 | 7/1953 | Hirsch | 464/45 |
| 2,713,463 | 7/1955 | Sarah | 242/84.5 A |
| 2,760,357 | 8/1956 | Burns . | |
| 2,863,617 | 12/1958 | Chapin et al. . | |
| 2,943,466 | 7/1960 | Elliott . | |
| 3,120,357 | 2/1964 | Wood, Jr. | 242/84.5 A |
| 3,585,817 | 6/1971 | McCafferty, Jr. . | |
| 4,193,561 | 3/1980 | Stiner | 242/84.51 A |
| 4,391,419 | 7/1983 | Iwama | 242/84.5 A |

Primary Examiner—Stuart S. Levy
Assistant Examiner—Katherine Matecki
Attorney, Agent, or Firm—Wood, Dalton, Phillips, Mason & Rowe

[57] ABSTRACT

An improved drag assembly is provided and comprises replaceable cartridge assemblies which can be precalibrated for a range of drag settings. Different cartridge assemblies are provided. The reel has a drag knob assembly which supports a selectively replaceable spring and is latched to the reel housing with the spring bearing on the cartridge assembly. A knob is used to turn the drag knob assembly for advancing or retracting the knob assembly to increase or decrease tension on the spring and to increase or decrease the drag setting for controlling tension on the line. Cartridge assemblies and springs are calibrated and rated and paired with a particular rated test line for use in particular types of fishing. A method of changing cartridge assemblies and springs is included.

22 Claims, 8 Drawing Sheets

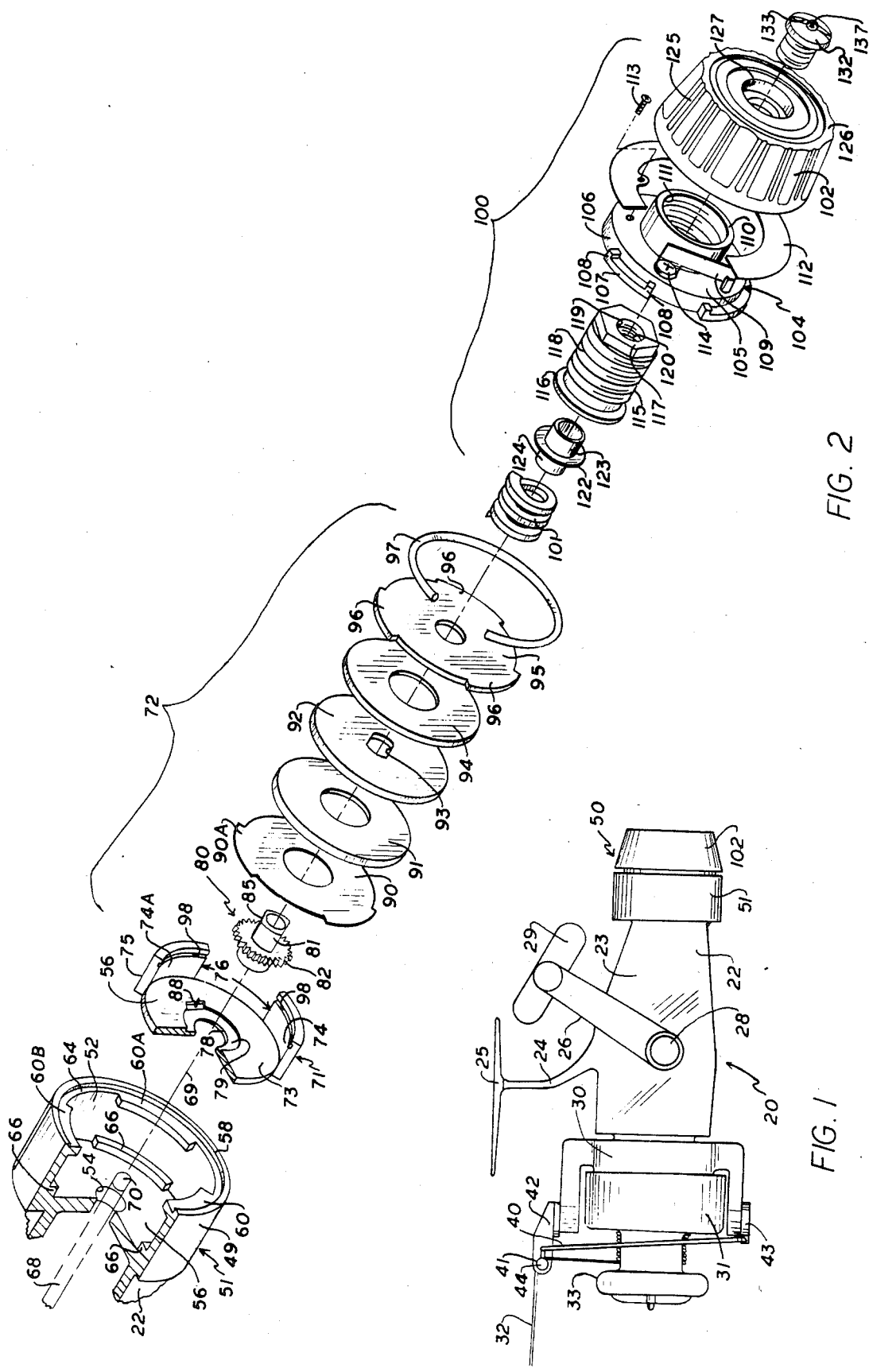

CARTRIDGE REAR MOUNTED DRAG ASSEMBLY AND METHOD

This application is a continuation of application Ser. No. 794,965, filed Nov. 5, 1985, and now abandoned, which is a continuation of Ser. No. 670,657, filed Nov. 9, 1984, and now abandoned, which is a continuation of Ser. No. 470,604, filed Feb. 28, 1983, and now abandoned, which is a continuation-in-part of Ser. No. 406,539, filed Aug. 9, 1982, now U.S. Pat. No. 4,488,689, issued Dec. 18, 1984.

BACKGROUND OF THE INVENTION

This invention relates to fishing reels and more particularly to a drag apparatus for a spinning style fishing reel.

BACKGROUND OF THE PRIOR ART

It is well known in the prior art to provide a drag controlled mechanism either in the front of the reel in and/or around the spool or in the rear of the body of the reel. In the case of rear controlled drag systems, many offer convenience of access through a side panel on the reel body but the result is a marginally adequate adjustment range, sensitivity and performance. In addition, the present rear controlled drag systems have the full range of drag resistance expected to be encountered by the reel regardless of the line test in use on the rod on the particular occasion must be attained within the rotational limits of adjustment of the control knob.

In some present rear controlled drag systems, changing drag components for maintenance, or to change the friction range of the reel is accomplished by one of the following procedures:

First, for side panel access reels remove the side panel from the body of the reel to gain access to the interior of the body. Remove the drag knob retainer clip, remove the center shaft, and finally remove the drag components. The retainer clip and all of the drag components are loose individual pieces, with the number of pieces of the drag component varying depending upon the design from approximately six to as many as ten pieces. To lose one or more pieces renders the adjustment and for that matter probably the reel, unusable until replacements are found.

Second, for rear access reels remove the drag knob by removing a screw or retainer clip; then remove all loose drag components through an opening at the rear of the reel. The second type of drag controlled system is limited to less than one revolution of the control knob to cover the full range of drag settings.

All in all, the number of parts or pieces to the drag control apparatus that can be lost or can individually fail, the access problem to the pocket for service replacement, and repair of the drag components and the limited size of the drag control apparatus results in less than 100% drag adjustment range and performance.

SUMMARY OF THE INVENTION

This invention addresses the majority of problems, objectionable conditions and limitations in rear controlled drags, while making substantial improvements in function and performance. The invention, in its preferred form, addresses the structural and maintenance limitations of the prior art, while providing greatly extended range and sensitivity of adjustment to meet the range requirements the reel is expected to encounter. The invention may be utilized in either the skirted (out-spool) or non-skirted (in-spool) type.

The improved reel has an enlarged cavity at the rear of the reel body in which one of several cartridge type pre-assembled drag control members is removably received. A drag adjusting knob is rotatably carried by the reel body and urges a spring member against the cartridge to control the drag applied to the center shaft of the reel. Each cartridge contains a drag driver keyed to the center shaft with a drag washer, friction washers and a stationary washer in the cartridge acting when placed under pressure to apply drag to the center shaft. The washers have relatively large diameter drag surfaces which permit lower pressure loading to attain a given frictional resistance. Each cartridge can be preassembled and based upon the rating of an appropriate spring can be calibrated to a specific range of drag settings and can be readily inserted and removed from the cavity in the reel body to provide the appropriate drag for the line rating and type of fishing. The drag cartridge can be quickly changed for changing drag ranges or for replacing worn or malfunctioning drag members. Since larger size friction surfaces require lighter pressure loading to get the desired drag settings, the friction surfaces will have a longer life span and will require less maintenance and replacement. The controlled drag system also uses a spring for transmitting the knob adjustment to the elements of the cartridge so that controlling the spring rate and force will also produce a selectable drag range. The materials used for the friction members in the cartridges and the selection of the spring rate and force provides an excellent drag adjusting system. The removable cartridges can be easily removed and replaced without the need for special tools. The assembled cartridge may be lubricated prior to insertion or at any time after insertion without any disassembly.

Each drag cartridge may either include an enclosing shell made of metal or plastic to retain lubricant and to protect the elements of the drag assembly or may have no shell wherein the elements are retained on the drag driver.

BRIEF DESCRIPTION OF THE DRAWINGS

FIG. 1 is a side elevational view of a spinning style fishing reel incorporating the invention therein;

FIG. 2 is an exploded perspective view of the structural parts of the improved drag controlling apparatus of FIG. 1;

GENERAL DESCRIPTION OF A SPINNING STYLE FISHING REEL

Figure 3:
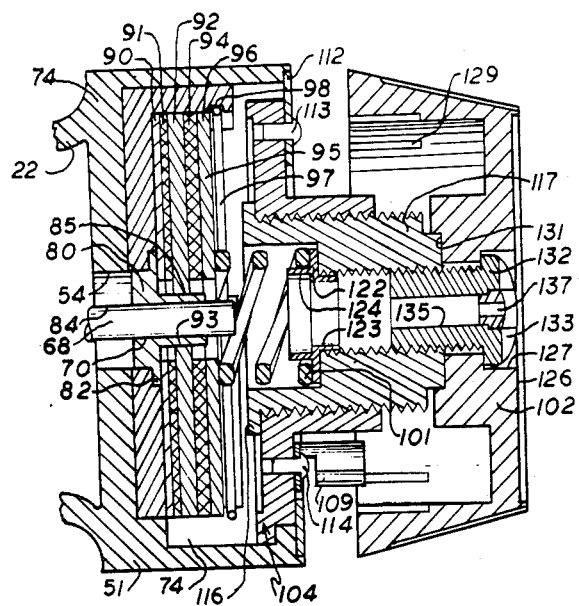
FIG. 3 is a vertical cross sectional view through the rear portion of the reel body and through the improved drag controlling apparatus.

In FIG. 1, a skirted style open-face fishing reel 20 is shown. A conventional style open-face fishing reel is equally useable with the invention. Both styles of reels function similarly, the only exception being the arrangement of the spool. As used hereinafter, the same numerals will designate common parts. The reel 20 has a housing 22 which includes an integral gear case 23, a stem 24 which connects the housing to a shoe 25. The shoe 25 is used to attach the reel to a spinning style fishing rod. The reel includes a crank assembly 26, rotatable about a crankshaft hub 28 with a rotatable winding handle 29 for use by a fisherman with his left hand for line retrieval while the rod (not shown) is being held by the right hand. On reels with the provisions for cranking left or right handed, the handle 29 may be disposed on the either side of the gear case 23 for accommodating the personal desires of the user.

An axially mounted rotor housing 30 is provided and is adapted to rotate about the axis of the spool 31 as the crank 26 is turned for line retrieval, with the line 32 being captured by the bail 40 passing over the line guide assembly 41 as shown. Bail 40 and line guide assembly 41 rotate with rotor 30 so that the line 32 is thereby wound on the spool 31. The bail 40 is pivotable between a retrieve position as shown in FIG. 1, to an open position for casting by means of the bail arms 42,43. An internal mechanism causes the line spool 31 to reciprocate axially back and forth as the rotor 30 winds the line 32 about the spool 31; but as in spinning reels generally, the spool 31 does not rotate about its central core axis, except as controllably permitted by the adjustable drag mechanism 50, as will be described hereinafter. The drag mechanism 50 is mounted in a drag housing 51 on the rear portion of the reel housing 22. Such permitted rotation of the spool may occur during line retrieval when a fish is on the other end of the line 32 resisting capture while still in the water; and thus the force of the drag friction is overcome by tension in the line. When the bail 40 is swung to an open position for casting, the line 32 may freely pay out from the spool 31 over lip 33. In FIG. 1 the bail 40 is shown in the "closed", "retrieve" or "rewind" position. The line guide roller 44 on the line guide assembly 41 is preferably rotatable; that is, it is preferably a miniature pulley to reduce the sliding friction which might otherwise cause line wear.

In paying out the line 32 over the lip 33 of the forward flange of the line spool 31 during casting, the fisherman using an open face spinning reel is obligated to use his finger to snub the line to arrest its pay out, since the normal line drag provisions are not operative unless the reel is in the rewind or line retrieval mode of operation.

DESCRIPTION OF THE PREFERRED EMBODIMENT

Referring to FIGS. 2-4 and 6-13, and in particular initially FIGS. 2-4 and 9-11, a drag controlling and adjusting apparatus 50 for an open face style fishing reel is disclosed. The drag controlling apparatus 50 includes the drag housing 51 integrally formed on the rear of the reel housing. The drag housing 51 has a cylindrical wall 49 defining a rearwardly facing cavity 52 with an opening 54 centrally disposed in a common wall 56 between the reel housing 22 and the cavity in the drag housing 51. The open mouth 58 of the cavity has three radially inwardly extending lugs 60,60a,60b equally spaced apart and defining slots 62 between each pair of lugs. A recessed ledge 64 is formed axially in from the outer edge of the mouth 58. One, two or three projecting abutment bosses 66 are integrally formed at the junction between the wall 49 and wall 56 in the cavity and are aligned with lugs 60, 60a and 60b. Each abutment 66 protrudes into the cavity and may be integral or may be a separate piece screwed or otherwise attached to the wall of the cavity. A centershaft 68 lying along the axis 69 of the reel has a splined or keyed end portion 70 extending through the opening 54 into the cavity 52.

A drag cartridge assembly 72, shown in FIGS. 2-4 and 6-8, has a cartridge shell 71 which comprises a circular base wall 73 and three equally sized and equally spaced segments 74,74a,74b of a cylindrical wall 75 extending transverse to the base wall 73. An aperture 78 with a recessed collar 79 is centrally disposed through wall 73. Although three equally sized and equally spaced segments 74,74a,74b are shown, it is to be understood that two or more segments 74 could be used as long as the spacing 76 between adjacent segments is slightly greater than the peripheral length of the lugs 60,60a,60b in the drag housing 51 and as long as the number of lugs 60,60a, 60b matches the number of spacings 76 between segments 74,74a,4b. The root of the spacing 76 at the wall 73 between segments 74, 74a and 74b is slightly longer than the peripheral length of the abutment bosses 66. With the cartridge shell 71 seated in the drag housing 51, the abutment bosses 66 on the housing 51 will seat in the spacings 76 between the respective segments 74, 74a and 74b so that the cartridge shell 71 will not rotate relative to the housing 51.

Figure 8:
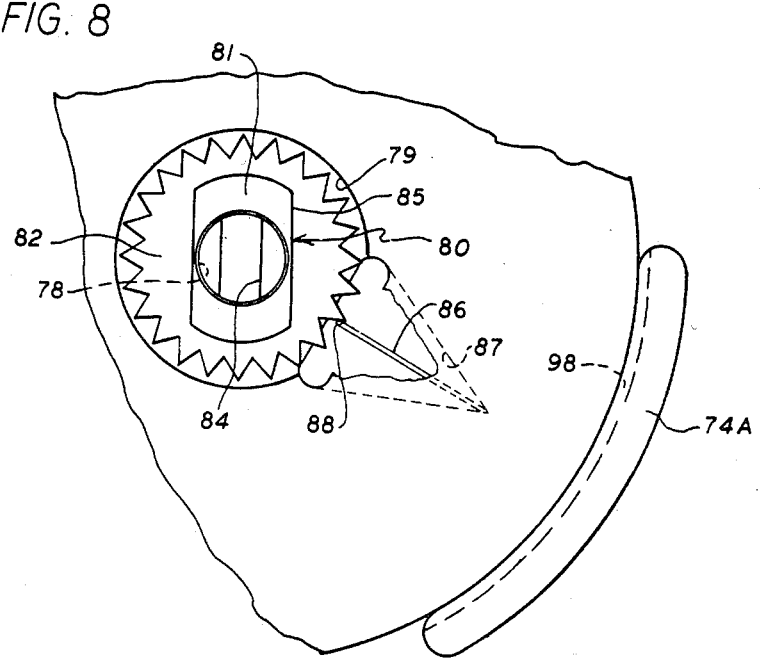
FIG. 8 is a broken away enlarged portion of the cartridge housing of FIG. 6 with a drag driver assembled therewith.
Figure 9:
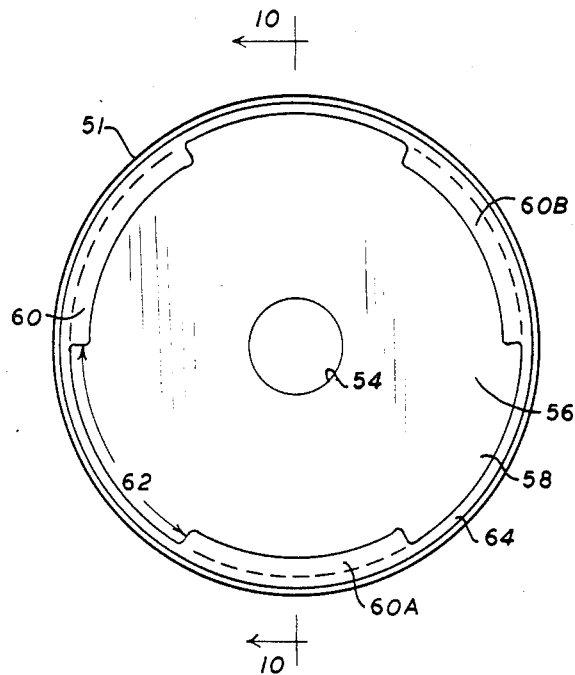
FIG. 9 is a view of the rear of the reel body looking into the drag cavity or pocket.
Figure 10:
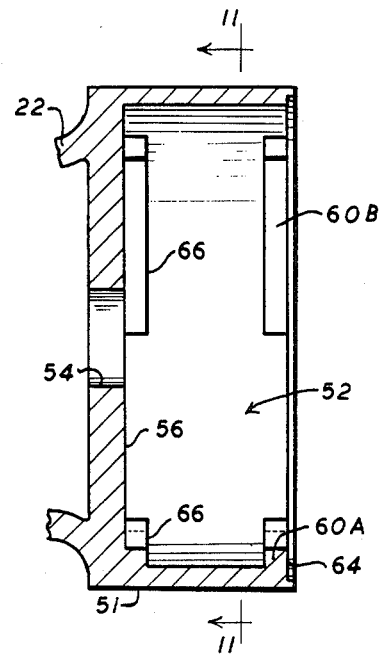
FIG. 10 is a cross sectional view of the rear portion of the reel body taken along the line 10—10 of FIG. 9.
Figure 11:
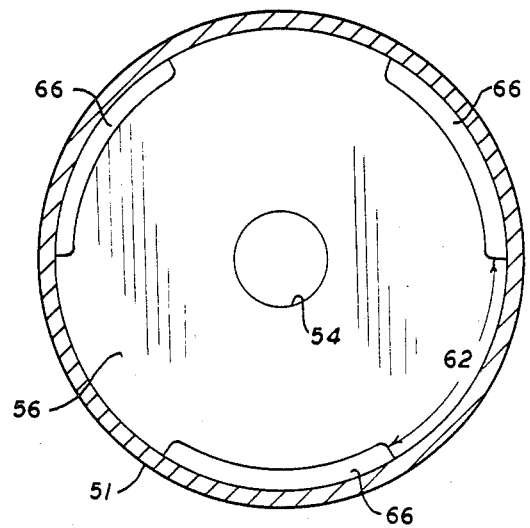
FIG. 11 is a cross sectional view of the rear portion of the reel body taken along the line 11—11 of FIG. 10.
Figure 12:
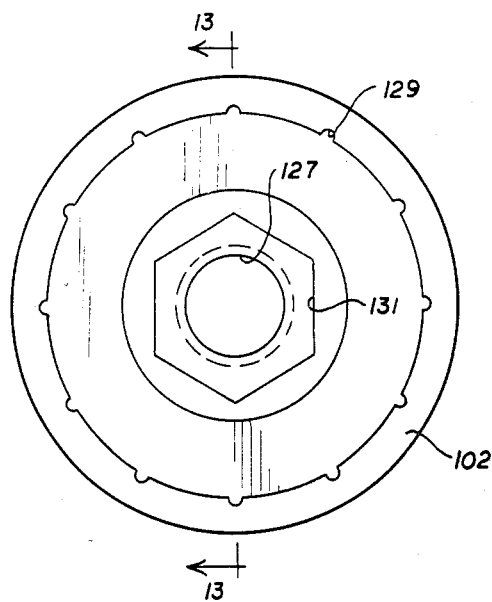
FIG. 12 is an elevational view of the adjusting knob looking into the inside thereof.
Figure 13:
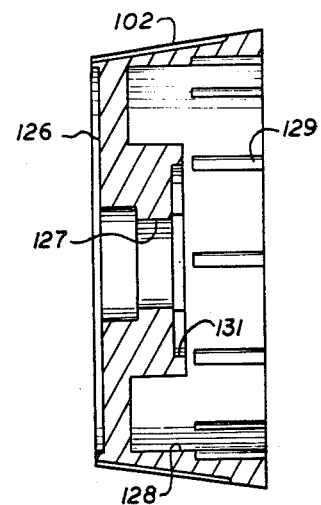
FIG. 13 is a cross sectional view of the knob taken along the line 13—13 of FIG. 12.

The drag cartridge assembly 72 has nested in the shell 71, a drag driver 80 which includes a tubular sleeve 81 attached to a toothed clicker gear 82. The clicker gear 82 is secured to the sleeve 81 in the general midportion of the sleeve. The sleeve 81 has an internal axially splined portion 84 on one end portion and an external axially splined portion 85 on the other end portion thereof (FIGS. 2 and 8). The sleeve 81 of the drag driver 80 is assembled through the aperture 78 in the shell 71. The internal splined portion 84 is adapted to mate with the splined end portion 70 of the centershaft. The clicker gear 82 nests partially in the recessed collar 79 and rotates freely with the sleeve 81 relative to the shell 71. A clicker spring 86 is secured at one end in a triangularly shaped recess 87 in the rear face of the wall 73 with the recess 87 overlapping and communicating with the collar 79 of the aperture 78. A free end 88 of the spring 86 projects into the space between the teeth of the gear 82 so that rotation of the drag driver 80 relative to the shell will create a clicking sound each time the free end 88 of the spring 86 snaps over a tooth on the gear.

Figure 4:
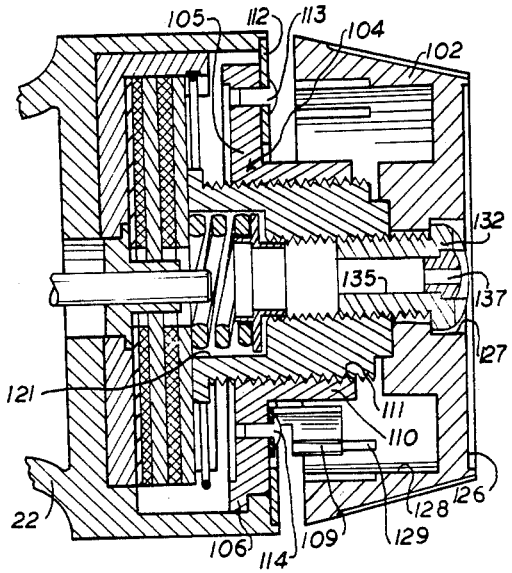
FIG. 4 is a vertical cross sectional view similar to FIG. 3 only with the drag force increased.

Referring particularly to FIGS. 2, 3 and 4, the drag cartridge assembly 72 with the drag driver 80 nested in the shell 71 and with the externally splined portion 85 projecting into the enclosure of the segments 74, 74a and 74b, has a base washer 90 abutting wall 56 with a friction washer 91 between the base washer 90 and a drive washer 92. The base washer 90 overlaps the gear 82 on the drag driver 80 to hold the driver in assembled relation in the collar 79 of the shell. The base washer 90 has outwardly projecting ears 90A which rest in the spacings 76 between the segments 74, 74a and 74b to prevent rotation of the base washer relative to the shell 71. The drive or driven washer 92 is keyed by spline 93 to the splined portion 85 of the drag driver 80 so as to rotate with the drag driver and centershaft 68. A second friction washer 94 bears against the other face of the drive washer 92 and is held in position by a stationary or fixed washer 95 which has radially outwardly projecting lugs 96 nesting in the spacings 76 between the segments 74,74a,74b of the shell 71. A lock ring 97 seats in grooves 98 formed in the radial inner surfaces of the segments 74,74a,74b to retain the parts of the cartridge assembled in the shell 71.

Each drag cartridge assembly 72 can be provided with a different drag setting range. That is, by providing different friction surfaces on either or both the base washer 90, driver washer 92 and stationary washer 95 and by providing the friction washers 91 and 94 of different friction materials different drag setting ranges can be established.

A drag knob assembly 100 is provided and is assembled with the open mouth 58 of the housing 51 so that a compression spring 101 of the knob assembly bears against the stationary washer 95 of the cartridge 72 as the knob 102 is rotated to increase or decrease the drag on the centershaft 68. More specifically, referring variously to FIGS. 2,3,4,12 and 13, a cover plate 104 is provided and has a body portion 105 with an axially disposed flange 106 about the periphery thereof. Radial locking lugs 107 project outward from the flange 106 and have a peripheral length slightly less than the length of the slots 62 between the lugs 60,60a,60b of the housing 51. Detents or locking ribs 108 are formed at the extreme ends of the upper surfaces of the locking lugs 107. The locking lugs 107 are slightly longer than the lugs 60,60a,60b so that the detents or locking ribs 108 on each locking lug are spaced apart a distance equal to the outside peripheral length of each lug 60,60a,60b. An axially extending sleeve 110 is integrally formed with the body portion 105 and is internally threaded at 111. A seal ring 112 of resilient material is screwed or riveted as at 113 to the outer face of the body portion 105 of the cover plate and projects radially outward from the periphery of the body portion 105 in overlapping relation with the locking lugs 107. A detent spring 109 is anchored by screw or rivet 114 at one end portion to the outer face of the cover plate 104. The detent spring extends along a chord of the plate 104 and has a curved contact end.

A threaded adjusting member 115 has a radial flange 116 at one end and a hexagonal portion 117, or the like, at the opposite end. The member 115 has an external thread 118 substantially throughout its length with an internal thread 119 in a bore 120 in the center of the hexagonal portion. The adjusting member 115 has a blind hollow portion 121 extending axially inward from the flanged end. A centering and retaining member 122 has one sleeved end portion 123 force fit into the bore 120 with an opposite sleeved end portion 124 fitting in the end of the spring 101 to retain the spring assembled with the adjusting member and cover plate 104. The adjusting member 115 is threaded into the threaded sleeve 110 with the hexagonal portion 117 extending axially beyond the end of the sleeve 110.

The drag adjusting knob 102 has a radially and axially outwardly flared and textured gripping wall surface 125 joined by an end wall portion 126 which has a recessed aperture 127 in the midportion thereof. Internally, the wall 125 has a cylindrical portion 128 with axially extending, equally spaced fluting 129. The knob 102 has on the inside of the end wall portion 126 a hexagonal shaped recess 131 surrounding the aperture 127. The recess 131 of the knob is mated with the hexagonal portion 117 on the adjusting member 115 whereupon a retaining screw 132 is passed through aperture 127 and threaded into bore 119 for retaining the knob on the cover plate 104. It is understood that any suitable shaped portion 117 and recess 131 can be used to key the knob to the adjusting member. The detent spring 109 on the cover plate 104 has its curved end engaging the fluting 129 in the knob 102 so as to resist rotation of the knob relative to the cover plate 104 and to produce a clicking sound. The retaining screw 132 has a slot 133 diametrically across the top surface thereof with an aperture 135 extending axially through the screw. A lubrication fitting 137 is seated in the aperture 135. A passageway extends from the fitting 137 through the adjusting member 115, retaining member 122 and into the cartridge 72. Lubricant for the drag is applied through the fitting 137 without disassembly of the adjusting apparatus or any other part of the reel.

The drag knob assembly 100 is assembled with the housing 51 on the reel by first turning the knob until the flange 116 on the member 115 bears against the cover plate 104, then aligning the locking lugs 107 with the spacings 62 between the lugs 60,60a,60b on the housing. Moving the knob assembly toward the housing will contact the spring 101 against the stationary plate 95 of the cartridge as the locking lugs 107 move into the spacings 62 and the seal ring 112 abuts the end of the housing. Urging forward on the knob assembly will depress the spring 101 against the stationary plate and deform the seal 112 until the locking lugs 107 clear the lugs 60,60a,60b whereupon turning the knob assembly 100 relative to the housing will rotate the locking lugs 107 below the lugs 60,60a,60b until the detents 108 on the ends of the locking lugs 107 straddle the lugs 60,60a, 60b. Releasing the knob assembly 102 will permit the seal ring 112 to latch the locking lugs 107 and the lugs 60,60a,60b together so that the knob assembly 102 is now locked to the reel housing ready for use. The seal 112 will also seal out water and debris from the drag system.

Turning the knob 102 will turn the adjusting member 115 which will advance the adjusting member relative to the cover plate 104 to depress the spring 101 against the stationary washer 95 for increasing pressure between the friction washers 91 and 94 and the stationary washer 95, driven washer 92, and base washer 90 for increasing the drag on the drag driver 80 and centershaft 68.

Selection of the material of the friction washers 91,94 for the desired coefficient of friction matched with a spring 101 having a spring rate to meet specific requirements, allows a fisherman to install a selected cartridge assembly 72 combined with a properly rated spring to attain a drag system with the desired range and adjustment sensitivity to meet the requirements of line weight and type of fishing.

Figure 16:
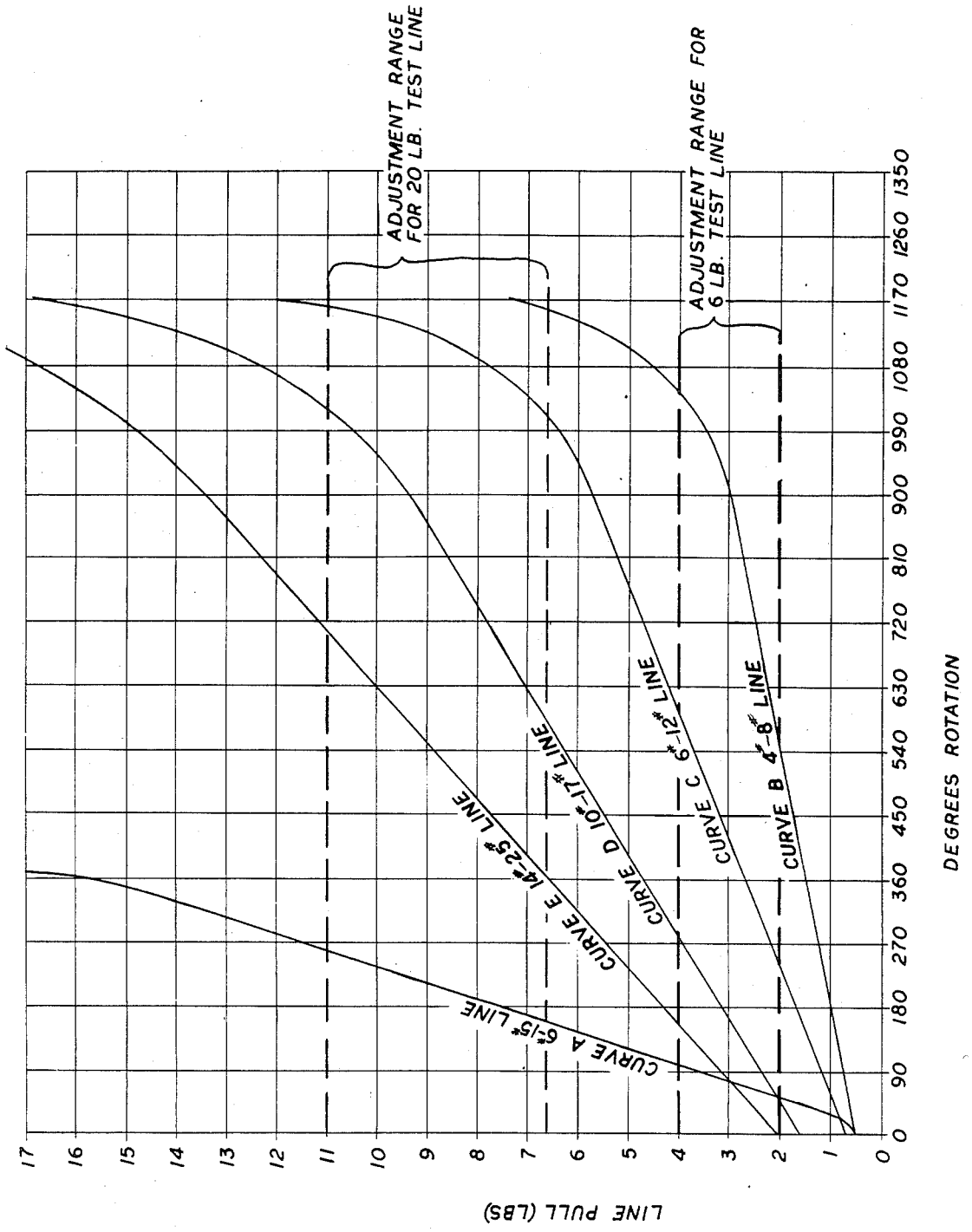
FIG. 16 is a chart of line pull in pounds versus degrees of rotation with curves of the prior art and of different combinations of the improved cartridge system.

The chart shown in FIG. 16 shows some of the effects of possible selection combinations of friction coefficients and spring rate. The chart has line pull (measured line resistance) in pounds versus degrees of rotation of the knob to adjust the drag. The curves on the chart are curves based on different strength rated lines. Curve A is a prior art rear drag system where one drag assembly must meet the entire range of fishing requirements. Since the normal setting of the drag is from ⅓ to a maximum of ⅔ of the rated line strength, the drag adjustment range for a line of six pound class is approximately 65 degrees of rotation of the knob.

Curve B uses the invention wherein the cartridge assembly uses friction washers 91,94 made of a material with a low coefficient of friction and uses a spring 101 with a low load rate selected for use with lines from 4-pound to 8-pound strength. Using a 6-pound line, the usable adjustment is approximately two full turns (720°) of the drag adjustment knob 102.

Curve C uses the same cartridge assembly as curve B but with a higher rated spring 101.

Curve D uses a cartridge assembly with friction washers 91,94 with a higher coefficient of friction and with a low rated spring 101 for use with heavier test line.

Curve E uses even a heavier test line and has a cartridge assembly with a high coefficient of friction and a spring rated with a higher load rating.

A typical low coefficient of friction material would be Teflon. A high coefficient material would be asbestos. A typical low spring rate would be 500 lbs. per inch deflection and a typical high spring rate would be 1000 lbs. per inch deflection. These examples are for illustration only and are not to be considered limiting in nature.

Figure 5:
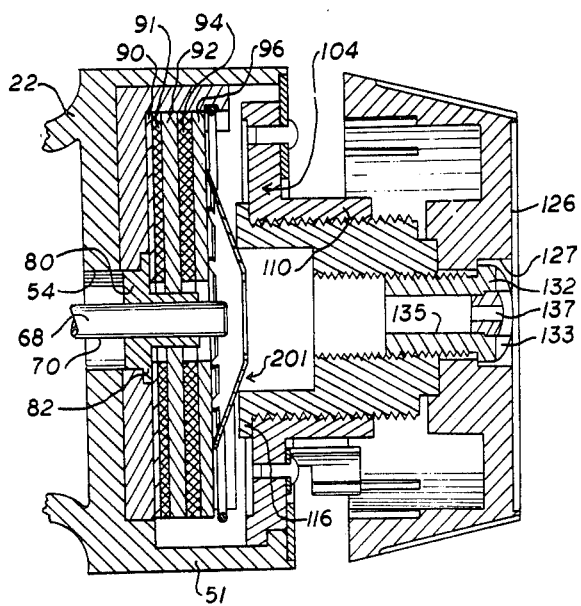
FIG. 5 is a vertical cross sectional view similar to FIGS. 3 and 4 only showing a modified form of spring.
Figure 6:
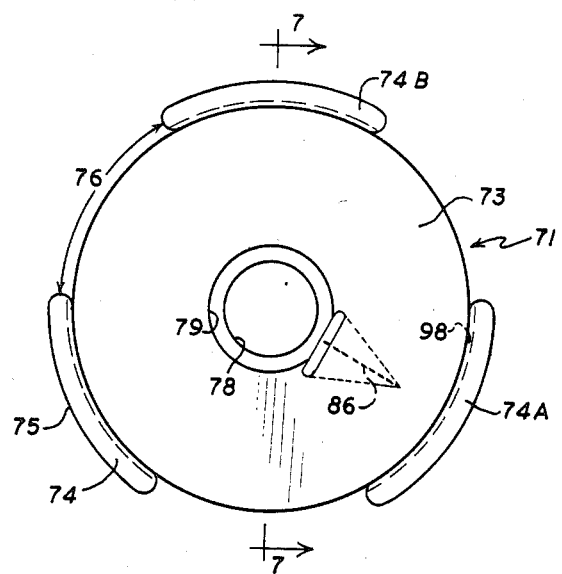
FIG. 6 is a plan view of the cartridge housing.
Figure 7:
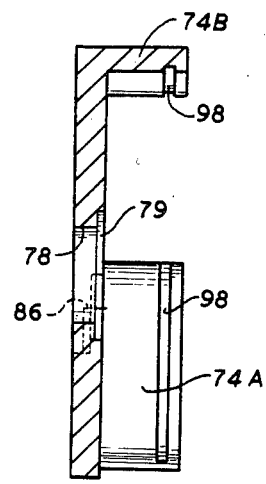
FIG. 7 is a cross sectional view of the cartridge housing of FIG. 6.
Figure 14:
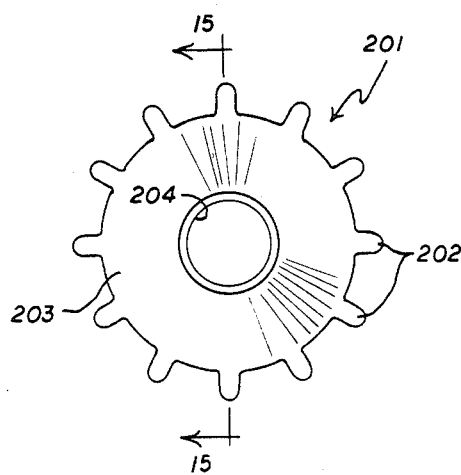
FIG. 14 is a plan view of a modified form of spring.
Figure 15:
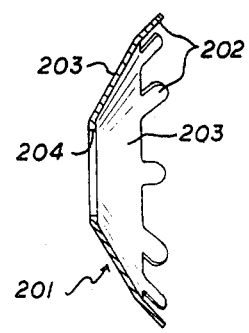
FIG. 15 is a cross sectional view taken along the line 15—15 of FIG. 14.

FIGS. 5, 14 and 15 show a modified form of the invention and in particular a disc shaped spring member 201 having multiple fingers 202 axially and radially extending from a cone-shaped body portion 203. An opening 204 extends through the center portion thereof. As shown in FIG. 5, the spring member 201 is positioned between the stationary washer 95 of the cartridge assembly 72 and the flanged end portion 116 of the axially movable member 115 whereby turning the knob 102 will depress the spring member 201 and apply drag to the centershaft through the cartridge assembly.

It is contemplated that several cartridge assemblies 72 will be available for use with a particular fishing reel. Each cartridge assembly will have a rating depending upon the material of the friction washers and/or the surface characteristics of the stationary washer 95, driven washer 92, and base washer 90. A choice of different springs 101 will also be available which will also be rated. A fisherman can establish the drag setting range for his reel by backing the knob 102 to the off position (with the flange 116 against the cover plate 104) whereupon depressing and turning the knob assembly relative to the reel housing will disengage the locking lugs 107 from the lugs 60,60a,60b so that the knob assembly 100 can be removed from the reel. The drag cartridge assembly in the cavity is removed by shaking or cranking the reel by rotating crank assembly 26 with the cavity facing downward. The selected drag cartridge assembly 72 is dropped into the cavity by aligning segments 74, 74a and 74b with slots 62 which also properly aligns cartridge assembly 72 with the abutments 66 so that the cartridge assembly will not turn relative to the reel. In the process of inserting the cartridge, the keyed portion 70 of the centershaft is oriented to align and enter the keyed portion 84 of the drag drive member 80 so that the centershaft is keyed to the driven washer 92 through the key 85 in the drive member 80 and the key 93 in the driven washer 92. The spring 101 in the knob assembly 101 is popped out and the newly selected spring 100 is force fit onto the retainer 122. The knob assembly is then assembled with the reel by aligning the locking lugs 107 with the spacings 62, and depressing and turning the knob assembly until the detents 108 straddle the lugs 60,60a,60b. A force resulting from deflection of seal ring 112 now causes seating of the knob assembly on the reel housing and the knob can be turned to adjust the drag. The spool 31 can also be changed to install a line with a test rating commensurate with the drag setting.

The assembly and disassembly of the drag adjusting assembly with the reel is accomplished without tools, and since the cartridge assembly is a single unit, there are no multiplicity of parts to lose.

Each cartridge assembly 72 can be repaired or modified easily. That is, the lack ring 97 can be contracted to remove it from the grooves 98 whereupon replacement friction washers 91,94, base washer 90 and stationary washer 95 can be individually or collectively replaced. The replacement can be in kind or can be of different materials and of different surface characteristics as desired.

Lubrication of the drag may be accomplished by application of lubricant through the lubrication fitting 137 which by virtue of preassembly is an integral part of the retaining screw 132.

Figure 17:
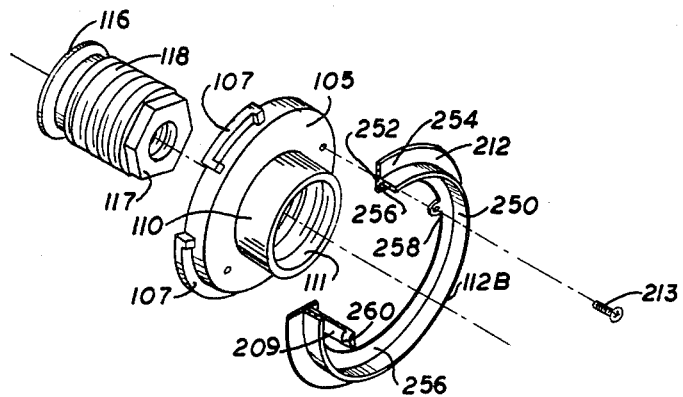
FIG. 17 is an exploded perspective view of the structural parts of a modified form of ring seal for sealing between the knob and the drag housing.
Figure 19:
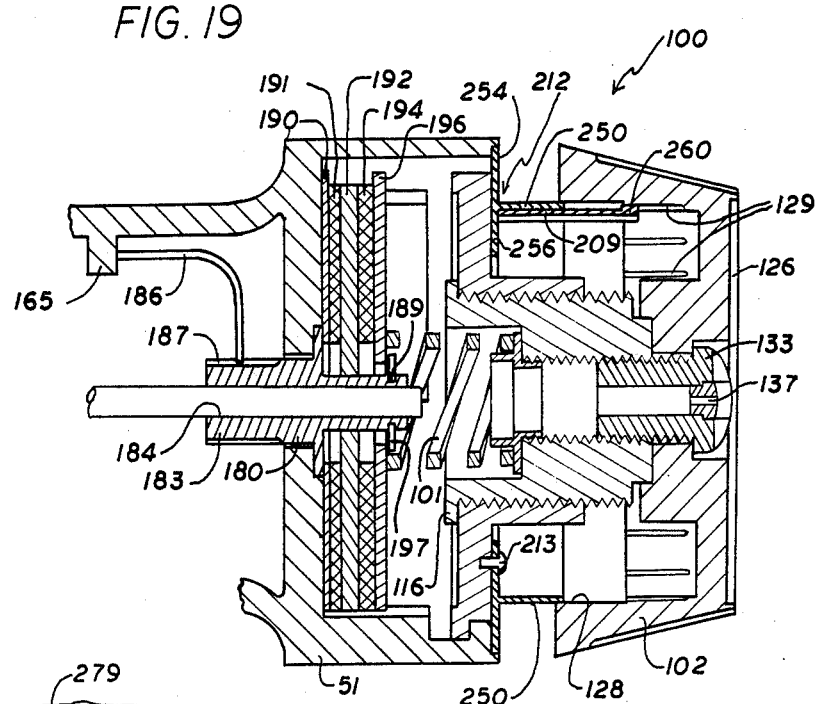
FIG. 19 is a vertical cross-sectional view through the rear portion of the reel body and through the modified ring seal and modified drag controlling apparatus.

FIGS. 17 and 19 show the drag knob assembly 100 with a modified form of seal ring 212 and detent spring 209. More specifically, seal ring 212 is comprised of a cylindrical body portion 250 integrally formed at one end with an intermediate part of a flat planar ring member 252 producing a radially outwardly projecting flange 254 and a radially inwardly projecting flange 256. Mounting tabs 258 project inward from the flange 256 for receiving fasteners 213, such as screws or rivets, to secure the tabs and seal ring 212 to the outer face of the body portion 105 of the cover plate 104 so that the sealing flange 254 overlaps the locking lugs 107. The sealing flange 254 on the seal ring 212 engages with the axial end face of the housing 51 when the drag knob assembly 100 is assembled with housing 51 as has been described hereinabove.

The cylindrical body portion 250 of the seal 212 has an outside diameter of such a size as to engage the inside cylindrical surface 128 of the knob 102 (FIG. 19) and has an axial length sufficient to continue to be in contact with the inside surface throughout the full axial extent of adjustment of the knob 102 so as to effect a seal between the knob and the cover plate 104. The detent spring 209 is integrally formed with or is secured to the cylindrical body portion 250 of the seal ring 212 and projects axially beyond the end of the cylindrical body portion 250. A protrusion 260 is formed on the outer face of the end portion of the spring 209 and is adapted to engage the spaced fluting or detents 129 on the inside surface of the knob. As the knob 102 is rotated, the spring 209 and protrusion 260 snap from detent to detent and serve to resist rotation of the knob and to give a physical feel and audible sound which can be of assistance to the fisherman.

The seal ring 212 seals the inside of the housing 51 and the inside of the drag knob assembly 100 from water and other elements. The seal ring 212 seals against the axial end of the housing 51 and against the inside of the knob 102 to eliminate contaminants and pollutants from infiltrating the operative parts of the drag assembly. It should be understood that the seal ring 212 could be used with the reel structure of FIGS. 1-5 and variations thereof without departing from the spirit of the invention.

Figure 18:
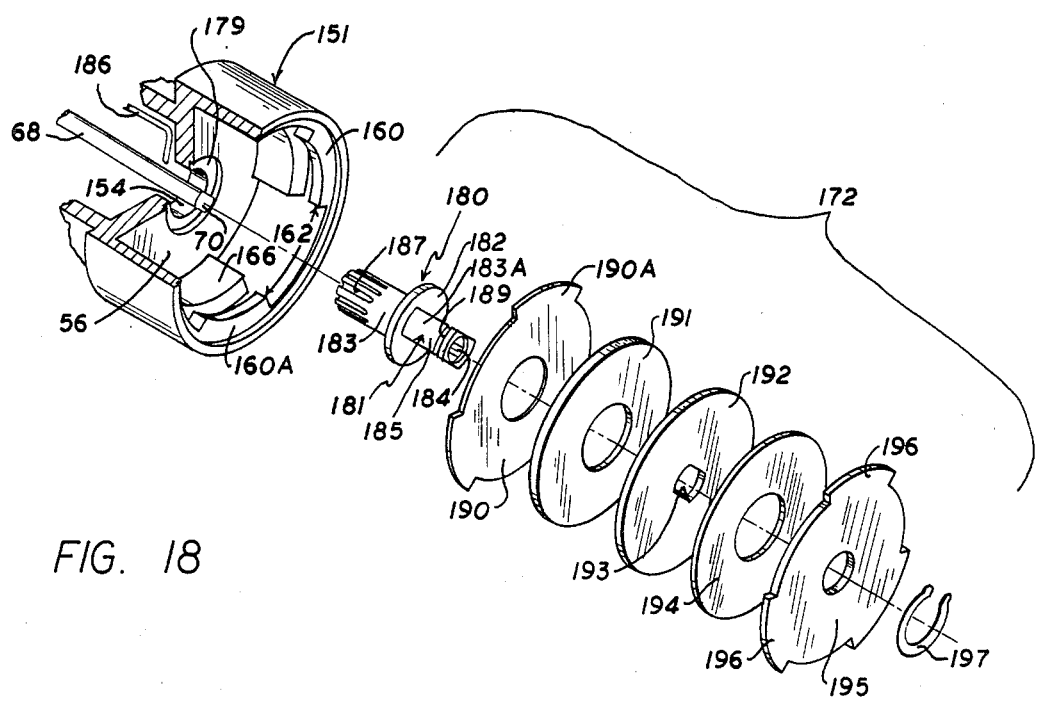
FIG. 18 is an exploded perspective view of the structural parts of a modified form of improved drag controlling apparatus.

FIGS. 18 and 19 shows a modified form of a cartridge assembly 172 and a modified form of drag driver 180. The cartridge assembly 172 is assembled on a sleeve 181 of the drag driver 180 so as to eliminate the shell of the cartridge assembly as disclosed in FIGS. 2-5 inclusive. That is, the drag driver 180 includes the tubular sleeve 181 attached to a flange member 182 at an intermediate part of the sleeve. The sleeve 181 has an internally splined portion 184 which may extend axially the full length of the sleeve or may extend through the one end portion 183. The other end portion 183a of the sleeve has an external axially splined portion 185 with a slot 187 extending radially about the outer end of the end portion 183a. The end portion 183 of the sleeve 181 has equally spaced apart axial detents 187 formed in the outer surface thereof. The common wall 56 between the drag housing 151 and the reel housing 22 has an opening 154 through which the splined end portion 70 of the centershaft 68 freely extends. A recessed collar 179 is formed in the wall 56 and is disposed concentrically about the opening 154. The internal spline 184 in the sleeve 181 mates with the spline 170 on the centershaft 68 with the end portion 183 of the sleeve 181 passing freely through the opening 154 and the flange 182 nesting loosely in the recessed collar 179 in the wall 56.

A clicker spring 186 is fixed at one end (FIG. 19) to a lug 165 on the inside of the reel housing 22 with the other free end of the clicker spring 186 extending into overlapping relationship with the opening 154 in the wall 56 so that when the drag driver 180 is in position in the opening 154, the free end of the clicker spring 186 engages in one of the detents 187 in the end portion 183.

The cartridge assembly 172 includes the drag driver 180 with a base fixed washer 190 assembled on the end portion 183a and abuts the flange 182. A friction washer 191, a drive washer 192, another friction washer 194 and another base fixed washer 195 are assembled on the end portion 183a with the drive washer 192 having a splined hole 193 which mates with the spline 185 on the end portion 183a of the sleeve. The outer end of the end portion 183a of the sleeve extends beyond the other base fixed washer 195 so that a retainer clip 197 can be seated in the slot 189 to retain the washers 190,191, 192,194 and 195 assembled on the drag driver 180. It will be noted that the cartridge assembly 172 can be removed from or inserted in the drag housing 151 and does not include a cartridge shell as shown in the version of FIGS. 2-5.

The drag housing 151 has a cylindrical wall 149 defining a rearwardly facing cavity 152. The open mouth 158 of the cavity has three radially inwardly extending lugs 160,160a,160b equally spaced apart and defining slots 162 between each pair of lugs, substantially the same as for the version of FIGS. 2-5. Within the cavity 152 and extending along a substantial axial extent of the cavity are one, two or three radially inwardly projecting abutment bosses 166 (three bosses being shown). The boss or bosses 166 are shown integrally formed with the housing 151 at the junction between the wall 56 and wall 149 of the drag housing and are aligned with the lugs 160, 160a,160b. It will be noticed in FIGS. 18 and 19, that the lugs 160,160a and 160b are axially spaced from the axial ends of the boss or bosses 166. The bosses 166 may be separate pieces secured in place in the cavity using an appropriate fastening system, i.e. screws, welding, etc.

The base fixed washers 190 and 195 have, respectively, radially outwardly projecting ears or lugs 190a and 196 which have circumferential lengths which are slightly shorter than the spacing 162 between the lugs 160,160a,160b so that the ears or lugs 190a and 196 on the fixed washers 190,195 will pass freely therebetween. That is, the cartridge assembly 172 with the fixed washer 190, friction washer 191, drive washer 192, friction washer 194 and fixed washer 195 assembled on the sleeve 181 of the drag driver 180 and with the ears or lugs 190a, 196 axially aligned with each other is inserted in the drag housing by meshing the spline in the sleeve 181 with the spline on the shaft 68 and by aligning the ears and lugs 190a, 196 with the spacings 162 whereupon the cartridge assembly 172 can be assembled in the housing with the end portion 183 extending through opening 154 so that the click spring 186 will operatively engage with detents 187 on the portion 183. The flange 182 seats in the recess 179 with the outer face of the fixed washer 190 bearing against the inner face of the wall 56 and with the ears or lugs 190a, 196 between the bosses 166 to prevent rotation of the fixed washers 190,195 relative to the center shaft 68. Rotation of the centershaft 68 will rotate the drag driver 180 and the drive washer relative to the fixed washers 190,195 with the friction washers 191,194 sandwiched therebetween.

Each drag cartridge assembly 172 can be provided with a predetermined and different drag setting range in the same manner and for the same purpose described with respect to the FIGS. 2-5 version of the invention.

A drag knob assembly 100 substantially as described with respect to the version of the invention shown in FIGS. 2-5 is assembled with the drag housing 51 by inserting the lugs 107 on the knob assembly between the lugs 160,160a,160b with the spring 101 bearing against the fixed washer 195 and compressing the spring (and deflecting the seal ring 112 or 212) until the knob assembly can be rotated and released to lock the knob assembly into operative position with respect to the drag cartridge assembly. Turning the knob 102 will increase or decrease the loading of the drag on the centershaft with the turning of the knob creating a clicking sound as the spring 209 and protrusion 260 enter each detent in the knob. Should the drag resistance on the centershaft be exceeded by a load on the line, the drag driver 180 will rotate relative to the housing 51 and relative to the click spring 186 creating a clear and sharp series of clicks. The shell-less drag cartridge assembly 172 has most of the desirable advantages of the FIGS. 2-5 version but is less convenient and is less expensive. That is, to remove the cartridge from the housing it may be necessary to hand manipulate the washers to get them to drop out of the housing.

Figure 21:
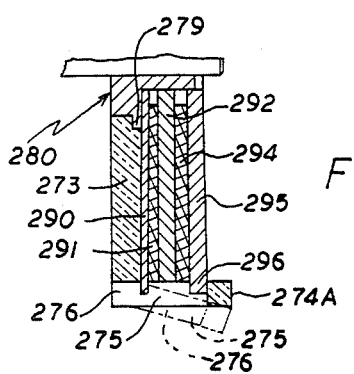
FIG. 21 is a partial cross-sectional view of the structural parts of FIG. 20 taken along the line 21—21 of FIG. 20.
Figure 20:
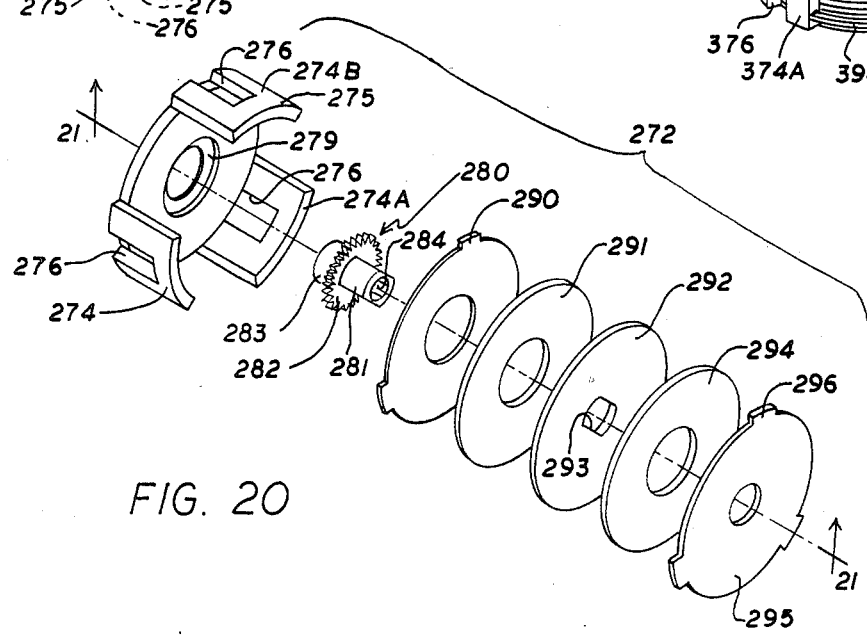
FIG. 20 is an exploded perspective view of the structural parts of another modified form of improved drag cartridge assembly.

Referring now to FIGS. 20 and 21, still a further modified form of drag cartridge assembly 272 is shown. A shell 275 made of plastic or like flexible material is molded or the like with segments 274,274a, 274b extending axially from the base wall 273 of the shell. Each segment 274,274a,274b has an axial blind slot 276 formed therein. The slots 276 are equally spaced apart in a radial direction. The fixed base washers 290 and 295 have ears or lugs 290a and 296 extending radially outward of the peripheral edge thereof. The ears or lugs 290a and 296 are equally spaced apart and are of a size and shape as to fit into the slots 276 in the segments 274,274a,274b. A drag driver 280 is seated in the recess 279 with the end portion 283 passing through the opening 278 in the shell 275 whereupon base washer 290 is assembled in the shell by deflecting the segments 274,274a and/or 274b to seat the ears or lugs 290a in the slots 276. The friction washer 291 and driver washer 292 are next assembled by mating the splined hole 293 in the washer 292 with the spline 285 on the sleeve 281 of the drag driver. The friction washer 294 is then dropped in after which the fixed washer 295 is assembled by deflecting the segments 274,274a and/or 274b, see dotted line position of FIG. 21, to permit the lugs 296 to seat in the slots 276. The cartridge is now ready for assembly with a reel as previously described. The cartridge 275 with the plastic shell has the advantages of the shell construction but is cheaper to manufacture. The shell retains the lubricant better and provides the advantages of ease of insertion and removal into the drag housing and the like. Although a click gear 182 is shown on the drag driver 282 it is to be understood that a flanged drag driver of the type described with respect to FIGS. 18 and 19 could be used in the FIG. 20 cartridge without departing from the invention.

Figure 22:
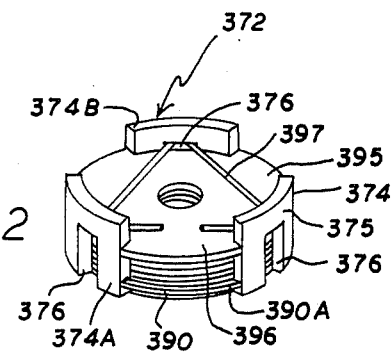
FIG. 22 is a perspective view of still a further modified form of improved drag cartridge assembly.

FIG. 22 shows another modified version of a drag cartridge assembly 372 wherein the washer elements of FIGS. 2 and 18 are employed in a metal shell 375 with the ears and lugs 390a and 396 of the fixed washers 390 and 395 nesting between the spaced segments 374,374a 374b. A triangular retainer clip 397 is used to hold the washers in the shell 275 by collapsing the clip 397 and inserting the three apexes in the slots 376 in the segments 374,374a,374b.

The lubricating features described with respect to FIGS. 1-16 are optionally usable with the modifications of FIGS. 17-21. The interchangeable nature of cartridges as described with respect to FIG. 16 is usable with the modifications of FIGS. 17-21.

I claim:

1. In an open faced spinning reel used for casting and retrieving a fishing line, the reel having a housing and a centershaft, the centershaft being axially reciprocable and having a keyed portion extending into a rearwardly facing cavity on the reel housing, a spool carried by a forward portion of the centershaft, a handcrank, a rotatably mounted bail support member connected by a transmission means to the handcrank to be rotated thereby; and bail means pivotally mounted on the support member to be rotated therewith; the improvement comprising drag adjusting means for changing the drag on the centershaft and on the spool, the drag adjusting means comprising:

(A) drag applying cartridge means seated in the rearward facing cavity of the housing and being keyed to the reel housing to prevent rotation of the cartridge means relative to the cavity and to the reel housing; the cartridge means including
  (a) drag drive means in the cartridge means keyed to the keyed portion of the centershaft;
  (b) driven means in the cartridge means keyed to the drag drive means;
  (c) a non-rotatable, axially movably means in the cartridge means which is axially spaced by friction means from the driven means; and
  (d) means for retaining the drag drive means, driven means and non-rotatable means together whereby the cartridge means includes the drag drive means removable keyed to the centershaft, driven means keyed to the drag drive means, and friction means between the driven means and the non-rotatable means;

(B) spring means external of the cartridge means and bearing against the non-rotatable, axially movable means;

(C) adjusting means carried by the reel housing and bearing against the spring means; knob means turning the adjusting means for increasing or decreasing the loading of the spring means against the non-rotatable portion of the cartridge means to increase or decrease the drag on the centershaft and spool; gear means carried by the drag drive member and clicker means carried by the cartridge means extending into contact with the gear means whereby rotation of the centershaft produces an audible clicking sound.

2. In an open faced spinning reel used for casting and retrieving a fishing line, the reel having a housing an a centershaft, the centershaft being axially reciprocable and having a keyed portion extending into a rearwardly facing cavity on the reel housing, a spool carried by a forward portion of the centershaft, a handcrank, a rotatably mounted bail support member connected by transmission means to the handcrank to be rotated thereby; and bail means pivotally mounted on the support member to be rotated therewith; the improvement comprising:

drag adjusting means for changing the drag on the centershaft and on the spool, the drag adjusting means including:

(a) drag applying cartridge means including a shell and removably seated in the rearward facing cavity and keyed to the reel housing; drag driver means in the cartridge means located within the shell and keyed to the keyed portion of the centershaft;

(b) driven means keyed to the drag driver means;

(c) a non-rotatable, axially movable means in the cartridge means spaced from the driven means and keyed to the shell, friction means located between the non-rotatable means and the driven means and between the driven means and the shell;

(d) spring means bearing against the non-rotatable means;

(e) adjusting means carried by the reel housing and bearing against the spring means;

(f) knob means on the adjusting means for turning the adjusting means to increase or decrease the loading of the spring means against the non-rotatable means in the cartridge means to increase or decrease the drag on the centershaft and spool;

(g) click means carried by the shell; and (h) gear means carried by the drag driver means and in contact with the click means, whereby turning of the centershaft will produce an audible sound.

3. In a spinning reel used for casting a bait attached to a fishing line and for retrieving the bait and fishing line after casting, the reel having a housing with a back end portion, an axially reciprocating centershaft extending through the housing and projecting rearward into a rearward facing cavity on the back end portion; a keyed portion on the centershaft extending into the rearward facing cavity;

a spool carried by the forward portion of the centershaft;

a handcrank;

a rotatably mounted bail support member connected by transmission means to the handcrank to be rotated thereby;

bail means pivotally mounted on the support member to be rotated therewith; the improvement comprising drag adjusting means for changing the drag on the centershaft and on the spool comprising:

(a) cartridge means removably seated in the rearward facing cavity and being keyed in the cavity against rotation;

(b) a drag driver means in the cartridge means keyed to the keyed portion of the centershaft;

(c) driven means keyed to the drag driver means and extending into the cartridge means;

(d) friction means in the cartridge means adjacent the driven means;

(e) non-rotatable means in the cartridge means adjacent a portion of the friction means;

(f) spring means bearing against the non-rotatable means; and (g) adjusting means carried by the reel housing and bearing on the spring means for increasing or decreasing the drag on the driven means in the cartridge means to resist rotation of the centershaft and the spool, the adjusting means includes a cover plate having latching means for locking the adjusting means to the reel housing;

the latching means comprising radially outwardly extending latching lugs, protruding means axially extending from the outer face of the latching lugs and wherein the back end portion of the housing has mating lugs radially extending into the rearward facing cavity, the protruding means straddling the mating lugs to lock the adjusting means to the reel housing.

4. In an open faced spinning reel used for casting a bait attached to a fishing line and for retrieving the bait and fishing line after casting, the reel having a housing with a back end portion, an axially reciprocating centershaft extending through the housing and projecting rearward into a rearward facing cavity on the back end portion; a keyed portion on the centershaft extending into the rearward facing cavity;

a spool carried by a forward portion of the centershaft;

a handcrank;

a rotatably mounted bail support member connected by transmission means to the handcrank to be rotated thereby;

bail means pivotally mounted on the support member to be rotated therewith; the improvement comprising drag adjusting means for changing the drag on the centershaft and on the spool comprising:

(a) cartridge means removably seated in the rearward facing cavity and being keyed in the cavity against rotation; the cartridge means including (i) a drag driver means in the cartridge means and keyed to the keyed portion of the centershaft;

(ii) driven means in the cartridge means and keyed to the drag driver means;

(iii) non-rotatable means in the cartridge means and keyed against rotation relative to the cartridge means and reel housing;

(iv) friction means in the cartridge means between the driven means and the non-rotatable means; and (v) means for retaining the driven means, the non-rotatable means and the friction means relative to the drag driver means to form the cartridge means;

(b) spring means independent of the cartridge means and bearing against the non-rotatable means; and (c) adjusting means carried by the reel housing and bearing on the spring means for increasing or decreasing the drag on the driven means in the cartridge means to resist rotation of the centershaft and the spool;

the adjusting means including a cover plate having latching means for locking the adjusting means to the reel housing; and an axially movable member threaded through the cover plate, the spring means being nested in the axially movable member and further including knob means connected to the movable member whereby turning the knob means advances or retracts the movable member and increases or decreases the drag on the centershaft; and wherein detent means are carried by the cover plate in engagement with detents in the knob means for resisting rotation of the knob means relative to the reel and wherein an audible sound is generated when the knob is turned to adjust the drag setting.

5. In an open faced spinning reel used for casting a bait attached to a fishing line and for retrieving the bait and fishing line after casting, the reel having a housing with a back end portion, an axially reciprocating centershaft extending through, the housing and projecting rearward into a rearward facing cavity on the back end portion; a keyed portion on the centershaft extending into the rearward facing cavity;

a spool carried by a forward portion of the centershaft;

a handcrank;

a rotatably mounted bail support member connected by transmission means to the handcrank to be rotated thereby;

bail means pivotally mounted on the support member to be rotated therewith; the improvement comprising drag adjusting means for changing the drag on the centershaft and on the spool including:

(a) cartridge means removably seated in the rearward facing cavity and being keyed in the cavity against rotation; the cartridge means having (i) a drag driver means in the cartridge means and keyed to the keyed portion of the centershaft;
(ii) driven means in the cartridge means and keyed to the drag driver means;
(iii) non-rotatable means in the cartridge means and keyed against rotation relative to the cartridge means and reel housing;
(iv) friction means int he cartridge means between the driven means and the non-rotatable means; and
(v) means for retaining the driven means, the non-rotatable means and the friction means relative to the drag driver means to form the cartridge means;

(b) spring means independent of the cartridge means and bearing against the non-rotatable means; and
(c) adjusting means carried by the reel housing and bearing on the spring means for increasing or decreasing the drag on the driven means in the cartridge means to resist rotation of the centershaft and the spool;

the adjusting means including a cover plate having latching means for locking the adjusting means to the reel housing;
an axial movable member threaded through the cover plate, the spring means being nested in the axial movable member and further including knob means connected to the movable member whereby turning the knob means advances or retracts the movable member and increases or decreases the drag on the centershaft; and
wherein lubrication means is provided in the knob means for lubricating the drag without removing the adjusting means form the reel housing.

6. An open faced spinning reel used for casting a bait attached to a fishing line and for retrieving the bait and fishing line after casting,
the reel having a housing with a front forward spool end face, a back end portion and a centershaft extending through the housing and projecting rearward into a rearward facing cavity in the back end portion; a keyed portion on the centershaft extending into the rearward facing cavity;
a spool carried by the forward projecting portion of the centershaft, which spool during casting is non-rotating and from which fishing line is unwound;
a handcrank;
a rotatably mounted bail support member connected by transmission means to the handcrank to be rotated thereby;
bail means pivotally mounted on the support member to be rotated therewith; the improvement comprising drag adjusting means for changing the drag on the centershaft and on the spool comprising;
(a) a cartridge means having a base wall with an opening through which the keyed portion of the centershaft extends, the cartridge means being removably seated against rotation in the rearward facing cavity of the housing;
(b) drag driver means rotatably mounted in the cartridge means and keyed to the keyed portion of the centershaft for rotation with said centershaft, the drag driver means having a keyed portion along an outer surface thereof;
(c) driven means in the cartridge means encircling the drag driver means and being keyed to the keyed portion of the drag driver means, the driven means having, oppositely facing friction surfaces thereon;
(d) friction means in the cartridge means encircling the drag driver means on either side of the driven means;
(e) stationary means in the cartridge means keyed against rotation relative to the cartridge means;
(f) means retaining the drag driver means, driven means, friction means and stationary means in the cartridge means;
(g) spring means bearing against the stationary means for engaging the friction means between the stationary means and the driven means and between the driven means and the base wall; and
(h) actuator means carried by the reel housing and bearing on the spring means for adjusting the friction loading on the driven means for adjusting the resistance to rotation of the driven means, drag driver means, the centershaft and spool;
wherein an abutment is provided on a wall in the cavity, and the cartridge means has a recess in which the abutment seats to prevent the rotation of the cartridge means in the cavity; and
wherein the cartridge means has segments which align with lugs on the walls of the cavity to orient the recess on the cartridge means to align with the abutment on the wall of the cavity.

7. A cartridge assembly for use with a rear mounted drag for an open faced spinning reel comprising:
a drag driver having a sleeve with a keyed center hole and a radially outwardly directed flange means, external keying means on a portion of the sleeve on one side of the flange means;
a base washer encircling the keying means on the sleeve and bearing against the flange means;
keying means on the periphery of the base washer;
a friction washer encircling the keying means on the sleeve and bearing against the base washer;
a driven washer encircling the keying means on the sleeve and bearing against the friction washer, the driven washer being keyed to the keying means on the sleeve to rotate with the drag driver; and
means for retaining the drag driver, the base washer, the friction washer and the driven washer assembled together as a cartridge including slot means in the portion of the sleeve having the external keying means, and fastener means coacting with the slot means for retaining the washers assembled on the drag driver.

8. A cartridge assembly for use with a rear mounted drag for an open faced spinning reel comprising:
a drag driver having a sleeve with a keyed center hole and radially outwardly directed flange means, external keying means on a portion of the sleeve on one side of the flange means;
a base washer encircling the keying means on the sleeve and bearing against the flange means;
keying means on the periphery of the base washer;
a friction washer encircling the keying means on the sleeve and bearing against the base washer;
a driven washer encircling the keying means on the sleeve and bearing against the friction washer, the driven washer being keyed to the keying means on the sleeve to rotate with the drag driver;
means for retaining the drag driver, the base washer, the friction washer and the driven washer assembled together as a cartridge; and a shell having a wall with an opening through which another portion of the sleeve projects, at least two segment means projecting axially from the wall and being equally spaced apart, and the keying means on the base washer engaging the segment means to fix the base washer from rotating relative to the shell of the cartridge.

9. A cartridge assembly as claimed in claim 8 including the shell being of a plastic material and having an axially directed slot in each segments means, the keying means on the base washer engaging in the slots in the segment means to fix the base washer from rotating relative to the shell of the cartridge, and the axial ends of the slots being closed for retaining the washers assembled as a cartridge.

10. A cartridge as claimed in claim 8 including the shell being of metal and having an axially extending blind slot in each segment means, the keying means on the base washer engaging between the segment means to fix the base washer from rotating relative to the shell, and the retaining means including a spring clip seating in the slots for holding the washers assembled in the shell.

11. In an open faced spinning reel used for casting and retrieving a fishing line, the reel having a hosing and a centershaft, the centershaft being axially reciprocable and having a keyed portion extending into a cavity on the reel housing, a spool carried by a forward portion of the centershaft, a handcrank, a rotatably mounted bail support member connected by transmission means to the handcrank to be rotated thereby; and a bail means pivotally mounted on the support member to be rotated therewith; the improvement comprising:

drag adjusting means for changing the drag on the centershaft and on the spool, the drag adjusting means comprising:
(a) cartridge means seated int he cavity and having a drag driver means keyed to the keyed portion of the centershaft; fixed washer means in the cartridge means, means on the fixed washer means for preventing rotation of the washer means relative to the housing and relative to the cartridge means, driven washer means in the cartridge means and keyed to the drag driver means for rotation therewith, friction washer means in the cartridge means between the fixed washer means and the driven washer means, means for retaining the drag driver means, fixed washer means, driven washer means and friction means assembled as the cartridge means;
(b) spring means bearing against the fixed washer means;
(c) adjusting means carried by the reel housing and extending into an opening in the cavity in the housing, the adjusting means bearing against the spring means; means for increasing or decreasing the loading of the spring means against the fixed washer means to increase or decrease the drag on the driven washer means, on the centershaft and on the spool;
seal means for sealing the opening between the adjusting means and the reel housing, the seal means having a radial flange bearing against the reel housing and an axially extending body portion engaging in a matching portion of the adjusting means; and
detent means carried by the seal means and engaging the adjusting means to resist rotation of the adjusting means relative to the reel housing wherein turning of the adjusting means produces an audible clicking sound.

12. In an open faced spinning reel used for casting a bait attached to a fishing line and for retrieving the bait and fishing line after casting,
the reel having a housing with a cavity at a rear end portion thereof, an axially reciprocating centershaft extending through the housing and projecting rearwardly into the cavity; a keyed portion on the centershaft extending into the cavity;
a spool carried by a forward portion of the centershaft;
a handcrank;
a rotatably mounted bail support member connected by transmission means to the handcrank to be rotated thereby;
bail means pivotally mounted on the support member to be rotated therewith; the improvement comprising drag adjusting means for changing the drag on the centershaft and on the spool comprising:
(A) cartridge means removably seated in the cavity and being keyed in the cavity against rotation including:
(a) a drag driver means keyed to the keyed portion of the centershaft, said drag driver means including a sleeve and a radially directed means mounting intermediate the ends of the sleeve;
(b) keying means in the sleeve for keying the sleeve to the centershaft;
(c) driven washer means keyed to the drag driver means, one external end portion of the sleeve having keying means for keying engagement with the driven washer means;
(d) non-rotatable washer means being restrained against rotation relative to the housing and relative to the cartridge means,
(e) friction means in the cartridge means between the driven washer means and the non-rotatable washer means; and
(f) means for retaining the drag driver means, driven washer means, non-rotatable washer means and friction means assembled as the cartridge means, the retaining means engaging the end portion of the sleeve;
(B) adjusting means carried by the real housing and bearing against a portion of the cartridge means for increasing or decreasing the drag on the driven washer means in the cartridge means to resist rotation of the centershaft and the spool.

13. In an open faced spinning reel as claimed in claim 12 wherein the other end portion of the sleeve of the drag drive means extends away from the enumerated washer means and has detent means formed in the external surface thereof, and click spring means carried by the housing engaging the detent means to give an audible indication when the load on the centershaft exceeds the drag on the centershaft.

14. In an open faced spinning reel used for casting a bait attached to a fishing line and for retrieving the bait and fishing line after casting,
the reel having a housing with a cavity at a rear end portion thereof, an axially reciprocating centershaft extending through the housing and projecting rearwardly into the cavity; a keyed portion on the centershaft extending into the cavity;
a spool carried by a forward portion of the centershaft;
a handcrank;

a rotatably mounted bail support member connected by transmission means to the handcrank to be rotated thereby;

bail means pivotally mounted on the support member to be rotated therewith; the improvement comprising drag adjusting means for changing the drag on the centershaft and on the spool comprising:

(A) cartridge means removably seated in the cavity and being keyed in the cavity against rotation including:

(a) a drag driver means keyed to the keyed portion of the centershaft;

(b) driven washer means keyed to the drag driver means;

(c) non-rotatable washer means restrained against rotation relative to the housing and relative to the cartridge means, (d) friction means in the cartridge means between the driven washer means and the non-rotatable washer means; and (e) means for retaining the drag driver means, driver washer means, non-rotatable washer means and friction means assembled as the cartridge means;

(b) adjusting means carried by the reel housing and bearing against a portion of the cartridge means for increasing or decreasing the drag on the driven washer means in the cartridge means to resist rotation of the centershaft and the spool, wherein the cartridge means includes a shell having a body portion and at least two axially extending radially deflectable segments, slot means formed in the segments, and lug means on the non-rotatable washer means engaging in said slots to restrain rotation of the non-rotatable member relative to the shell.

15. In an open faced spinning reel used for casting a bait attached to a fishing line and for retrieving the bait and fishing line after casting, the reel having a housing with a cavity at a rear end portion thereof, an axially reciprocating centershaft extending through the housing and projecting rearwardly into the cavity; a keyed portion on the centershaft extending into the cavity;

a spool carried by a forward portion of the centershaft;

a handcrank;

a rotatably mounted bail support member connected by transmission means to the handcrank to be rotated thereby;

bail means pivotally mounted on the support member to be rotated therewith; the improvement comprising drag adjusting means for changing the drag on the centershaft and on the spool comprising:

(A) cartridge means removably seated in the cavity and being keyed in the cavity against rotation including:

(a) a drag driver means keyed to the keyed portion of the centershaft;

(b) driven washer means keyed to the drag driver means;

(c) non-rotatable washer means restrained against rotation relative to the housing and relative to the cartridge means, (d) friction means in the cartridge means between the driven washer means and the non-rotatable washer means; and (e) means for retaining the drag driver means, driven washer means, non-rotatable washer means and friction means assembled as the cartridge means;

(B) adjusting means carried by the reel housing and bearing against a portion of the cartridge means for increasing or decreasing the drag on the driven washer means in the cartridge means to resist rotation of the centershaft and the spool, wherein the cartridge means includes fastening means engaging the outermost washer means and the end of the keyed portion of the drag driver means to hold the cartridge means assembled.

16. In a fishing reel having a housing with a front and rear and defining a cavity at the rear of the housing, a rotatable centershaft having a keyed portion extending into the cavity on the reel housing and carrying a line-carrying spool for rotation therewith and means for selectively directing line onto the spool and for releasing line from the spool, an improved drag adjusting means for changing the resistance to rotation of the shaft and associated spool, the drag adjusting means comprising:

a wall on said housing defining said cavity and a rearwardly facing wall surface bounding a part of the cavity;

a driven element;

means for removably interconnecting the driven element and centershaft in operative position wherein the driven element follows rotation of the centershaft;

a second element having a friction generating surface to generate a drag force on the driven element with the driven element and second element in assembled relationship;

drag adjustment structure for biasably urging the second element selectively towards and away from the driven element to control the drag on the reel through a first predetermined drag range;

cartridge means separate from said housing and drag adjustment structure for maintaining the driven element and second element together inseparably, one from the other as a unitary first cartridge assembly, said cartridge means including a shell and means for fixing the second element against rotation relative to the shell;

means on the housing wall for removably admitting the first cartridge assembly into said cavity;

means for removably, fixedly maintaining the unitary first cartridge assembly within the cavity against the rearwardly facing wall surface with the driven element and centershaft in operative relationship; and means for removably attaching the drag adjustment structure to at least one of the unitary first cartridge assembly and reel housing, whereby, with said drag adjustment structure detached from the at least one of the cartridge and reel housing, the first cartridge assembly can be removed from the housing as a unit without fear of the driven element, second element and cartridge means separating one from the other, thereby allowing replacement of the unitary cartridge assembly with a second unitary cartridge assembly similar to the first cartridge assembly and having a drag adjustment range different than the first drag range.

17. The improved spinning reel of claim 16 in combination with a second unitary cartridge assembly, said second unitary cartridge assembly being structurally the same as the first cartridge assembly and having a drag adjustment range different than the first drag range, wherein the first and second unitary cartridge assemblies can be selectively used depending upon the range of drag desired.

18. The improved drag adjusting means of claim 16 wherein the drag adjustment structure comprises a spring element, rotatable means for selectively increasing and decreasing loading of the spring element upon rotation thereof, and a knob facilitating rotation of the rotatable means by the user.

19. The improved drag adjusting means of claim 18 wherein the rotatable means has a cover plate and locking means on the cover plate for latching the cover plate to the reel housing.

20. In a fishing reel having a housing defining a cavity, a rotatable centershaft having a keyed portion extending into the cavity on the reel housing and carrying a line-carrying spool for rotation therewith and means for selectively directing line onto the spool and for releasing line from the spool, an improved drag adjusting means for changing the resistance to rotation of the shaft and associated spool, the drag adjusting means comprising:
   a driven element;
   means for removably interconnecting the driven element and centershaft in operative position wherein the driven element follows rotation of the centershaft;
   a second element having friction generating surface to generate a drag force on the driven element with the driven element and second element in assembled relationship;
   drag adjustment structure for biasably urging the second element selectively towards and away from the driven element to control the drag on the reel through a first predetermined drag range;
   cartridge means separate from said housing for maintaining the driven element and second element together inseparably, one from the other as unitary first cartridge assembly;
   said cartridge means including means for fixing the second element against rotation relative to the cartridge means;
   means for removably, fixedly maintaining the unitary first cartridge assembly on the housing substantially entirely within the cavity with the driven element and centershaft in operative relationship; and
   means for removably attaching the drag adjustment structure to at least one of the unitary first cartridge assembly and reel housing,
   whereby, with said drag adjustment structure detached from at least one of the cartridge and reel housing, the first cartridge assembly can be removed from the housing as a unit without fear of the driven element, second element and cartridge means separating one from the other, thereby allowing replacement of the unitary cartridge assembly with a second unitary cartridge assembly similar to the cartridge assembly and having a drag adjustment range different than the first drag range.

21. In a fishing reel having a housing defining a cavity, a rotatable centershaft having a keyed portion extending into the cavity on the reel housing and carrying a line-carrying spool for rotation therewith and means for selectively directing line onto the spool and for releasing line from the spool, an improved drag adjusting means for changing the resistance to rotation of the shaft and associated spool, the drag adjusting means comprising:
   a driven element;
   means for removably interconnecting the driven element and centershaft in operative position wherein the driven element follows rotation of the centershaft;
   a second element having a friction generating surface to generate a drag force on the driven element with the driven element and second element in assembled relationship;
   drag adjustment structure for biasably urging the second element selectively towards and away from the driven element to control the drag on the reel through a first predetermined drag range;
   cartridge means separate forms aid drag adjustment structure for maintaining the driven element and second element together adjacent to each other inseparably, one from the other as unitary first cartridge assembly;
   said cartridge means including means for fixing the second element against rotation relative to the cartridge means;
   means for removably, fixedly maintaining the unitary first cartridge assembly on the reel housing at the cavity with the driven element and centershaft in operative relationship; and
   means for removably attaching the drag adjustment structure to the reel housing,
   whereby, with said drag adjustment structure detached from at least one of the cartridge and reel housing, the first cartridge assembly can be removed form the housing as a unit without fear of the driven element, second element and cartridge means separating one from the other, thereby allowing replacement of the unitary cartridge assembly with a second unitary cartridge assembly similar to the first cartridge assembly and having a drag adjustment range different than the first drag range.

22. In a fishing reel having a housing defining a cavity, a rotatable centershaft having a keyed portion extending into the cavity on the reel housing and carrying a line-carrying spool for rotation therewith and means for selectively directing line onto the spool and for releasing line from the spool, an improved drag adjusting means for changing the resistance to rotation of the shaft and associated spool, the drag adjusting means comprising:
   said housing having a wall defining said cavity;
   a driven element;
   means for rotatably interconnecting the driven element and centershaft in operative position wherein the driven element follows rotation of the centershaft;
   a second element having friction generating surface to generate a drag force on the driven element with the driven element and second element in assembled relationship;
   drag adjustment structure for biasably during the second element selectively outwards and away from the driven element to control the drag on the reel through a first predetermined drag range;

cartridge means for maintaining the driven element and second element together inseparably, one from the other as a unitary first cartridge assembly;

means for fixing the second element against rotation relative to the cartridge means, said housing wall having an opening to permit placement of the first cartridge assembly in and removal of the first cartridge assembly from said cavity;

means for removably, fixedly attaching the unitary first cartridge assembly to the reel housing at the cavity so that the driven element is interconnected to the centershaft; and means for removably attaching the drag adjustment structure to the reel housing so that the drag adjustment structure blocks the housing wall opening to prevent escape of the cartridge means through said housing wall opening, whereby, with said drag adjustment structure detached from the reel housing, the first cartridge assembly can removed from the housing as a unit without fear of the driven element, second element and cartridge means separating one from the other, thereby allowing replacement of the unitary cartridge assembly with a second unitary cartridge assembly similar to the first cartridge assembly and having a drag adjustment range different than the first drag range.

* * * * *

UNITED STATES PATENT AND TRADEMARK OFFICE
CERTIFICATE OF CORRECTION

PATENT NO. : 4,796,828

DATED : January 10, 1989

INVENTOR(S) : Richard R. Councilman

It is certified that error appears in the above-identified patent and that said Letters Patent is hereby corrected as shown below:

Column 12 (Claim 2), line 41, after "housing" cancel "an" and substitute therefor --and--;

Column 21 (Claim 20), line 41, after "as" insert --a--;
line 62, after "the", insert --first--;

Column 22 (Claim 21), line 19, after "separate", delete "forms aid"; and
line 22, after "as", insert --a--.

Signed and Sealed this

Second Day of July, 1991

*Attest:*

HARRY F. MANBECK, JR.

*Attesting Officer*   Commissioner of Patents and Trademarks

UNITED STATES PATENT AND TRADEMARK OFFICE
CERTIFICATE OF CORRECTION

PATENT NO. : 4,796,828
DATED : January 10, 1989
INVENTOR(S) : Richard R. Councilman It is certified that error appears in the above-identified patent and that said Letters Patent is hereby corrected as shown below:

Column 18 (Claim 12), line 45, after "the" cancel "real" and substitute therefor --reel--.

Signed and Sealed this

Twenty-second Day of September, 1992

Attest:

DOUGLAS B. COMER

*Attesting Officer*   Acting Commissioner of Patents and Trademarks